(12) United States Patent
Kwon et al.

(10) Patent No.: US 7,027,089 B2
(45) Date of Patent: Apr. 11, 2006

(54) IMAGE SENSOR WITH DEFECTIVE PIXEL ADDRESS STORAGE

(75) Inventors: Oh-Bong Kwon, Kyoungki-do (KR); Hyun-Joo Ahn, Kyoungki-do (KR)

(73) Assignee: Hynix Semiconductor, Inc., Kyounki-Do (KR)

( * ) Notice: Subject to any disclaimer, the term of this patent is extended or adjusted under 35 U.S.C. 154(b) by 678 days.

(21) Appl. No.: 10/189,942

(22) Filed: Jul. 3, 2002

(65) Prior Publication Data
US 2003/0007081 A1 Jan. 9, 2003

(30) Foreign Application Priority Data
Jul. 6, 2001 (KR) ............................... 2001-40445
May 22, 2002 (KR) ............................... 2002-28384

(51) Int. Cl.
*H04N 9/64* (2006.01)
(52) U.S. Cl. ..................................................... 348/247
(58) Field of Classification Search .................... None
See application file for complete search history.

(56) References Cited

U.S. PATENT DOCUMENTS 6,293,465 B1 * 9/2001 Heller et al. ................ 235/454

FOREIGN PATENT DOCUMENTS

KR 1998-82475 12/1998

OTHER PUBLICATIONS

Communication from Korean Intellectual Property Office dated Mar. 30, 2004 with translation (3 Pages).

* cited by examiner

*Primary Examiner*—David Ometz
*Assistant Examiner*—Adam L. Henderson
(74) *Attorney, Agent, or Firm*—Marshall, Gerstein & Borun LLP (57) ABSTRACT

Image sensors and methods to construct and use image sensors are disclosed. In an example, an image sensor includes a pixel array, a data store to store data transmitted from the pixel array, an image signal processing unit to perform signal processing on the output of the data store to improve the performance of the image sensor, a defective pixel address storage unit to store an address of a defective pixel by using a fuse blowing technology, a controller for receiving address information of the defective pixels from the defective pixel address storage unit and controlling the operation of the image sensor, and a defective pixel compensation unit for receiving the address information of the defective pixels from the defective pixel address storage unit, substituting data of the defective pixels with data of normal pixels around the defective pixels, and providing the substituted data to the image signal processing unit.

19 Claims, 12 Drawing Sheets

IMAGE SENSOR WITH DEFECTIVE PIXEL ADDRESS STORAGE

FIELD OF THE DISCLOSURE

The present disclosure relates generally to image sensors; and more particularly, to an apparatus and method for storing addresses of defective pixels of the image sensor.

DESCRIPTION OF RELATED ART

An image sensor is a device for picking up light images by using a property, which causes a semiconductor to react to the light. Namely, the image sensor is a device whose pixels detect different brightness and wavelengths of the light reflected from each object and which converts those detected values into electrical values. The image sensor changes the electrical values into voltage levels to which signal processing can be performed. Recently, VGA (640× 480 pixels) and SVGA (800×600 pixels) have been mainly used in image sensors. As digital still cameras come into universal use, an image sensor of a mega-pixel level (having more than one million pixels) will be commonly used. Therefore, a technology for the image sensor having over mega-pixel is necessary to secure a market of a next-generation image sensor.

Figure 1:
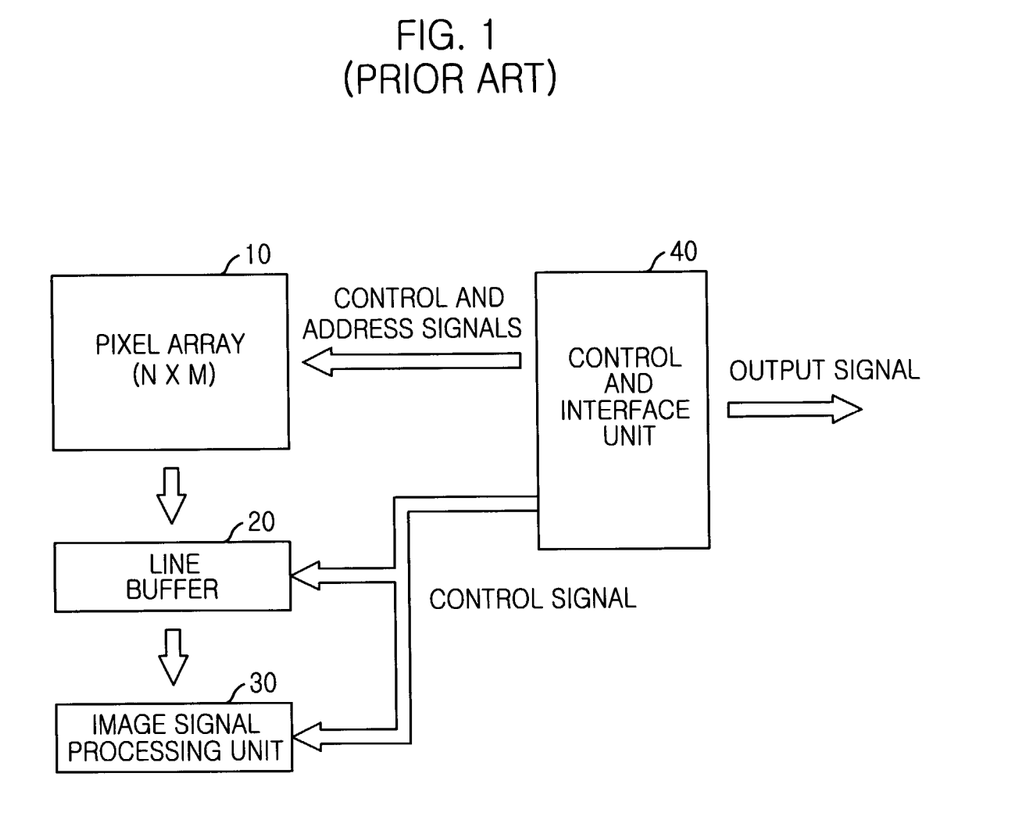
FIG. 1 is a block diagram of a typical prior art image sensor.

FIG. 1 is a block diagram illustrating a typical image sensor. As shown in FIG. 1, the typical image sensor includes a pixel array 10, a line buffer 20, an image signal processing unit 30 and a control and interface unit 40.

The pixel array 10 receives image information supplied from external objects. The line buffer 20 stores voltages transmitted from the pixel array 10. The image signal processing unit 30 performs signal processing on the outputs of the line buffer 20 in order to improve the performance of the image sensor. The control and interface unit 40 controls the whole operation of the image sensor and manages an interface with external systems.

More specifically, the pixel array 10 is composed of N (horizontal)×M (vertical) pixels to maximize the light reactivity. The pixel array 10 of N×M pixels, which detects the image information reflected from the external objects, is an important part in the image sensor. The line buffer 20 detects and stores voltages associated with the pixels of a selected row. The buffer 20 is composed of a plurality of lines to perform various functions in the image signal processing unit 30.

The image processing unit 30 performs various functions, such as color interpolation, color correction, gamma correction, auto white balance, auto exposure or the like, on the pixel values stored in the line buffer 20 to improve the performance of the image sensor.

The control and interface unit 40 controls the operation of the pixel array 10, the line buffer 20 and the image processing unit 30 by using a finite state machine (FSM) and manages the interface with the external systems. Furthermore, since the control and interface unit 40 includes a configuration register, the control and interface unit 40 can program information related with various internal operations. The image sensor is controlled according to the programmed information.

Meanwhile, as the number of pixels in the image sensor increases, the number of defective pixels, which are generated by the difficulty of the fabricating process, also increases. The defective pixels should be repaired to reduce the fabricating cost and to increase the yield.

A grade of the image sensor and a price thereof are determined according to the number of the defective pixels. If image sensors including unrepaired defective pixels are produced, the fabricating cost of the image sensor is increased because the yield is decreased.

In order to solve the above problem, a company fabricating products employing the image sensor (such as a digital still camera or the like), is provided with the image sensor chip having defective pixels. The company tests each pixel, records addresses of the defective pixels in an EEPROM, and then compensates data corresponding to the defective pixels, so that the image sensor having the defective pixels can be used as a normal image sensor.

However, since this test is carried out separately from testing at a wafer level, the time period for developing a product employing the image sensor is increased. Also, since the EEPROM has to be additionally embedded in the product, the product becomes bigger and its cost is increased.

On the other hand, if a manufacturer of the image sensor chip directly detects defective pixels through a wafer level test, records the addresses of the defective pixels, and then packages the EEPROM with the image sensor, the time to produce a product can be shortened because a company can use the image sensor chip without an additional pixel test. However, such an approach requires an extra process for fabricating the EEPROM in addition to the image sensor fabricating process. Thus, the fabricating process of the image sensor becomes complicated and the cost is increased.

SUMMARY OF THE INVENTION

In accordance with an aspect of the present invention, there is provided an image sensor comprising: a pixel array; a data store to store data transmitted from the pixel array; an image signal processing unit to perform signal processing to improve the performance of the image sensor; a defective pixel address storage unit to store addresses of defective pixels by using a fuse blowing technology; a control unit to receive address information associated with the defective pixels from the defective pixel address storage units and to control the operation of the image sensor; and a defective pixel compensation unit to receive the address information of the defective pixels from the defect pixel address storage unit, to substitute data of the normal pixels around the defective pixels for data of the defective pixels and to provide the substituted data to the image signal processing unit.

DETAILED DESCRIPTION OF THE PREFERRED EXAMPLES

Hereinafter, example apparatus and methods for storing information identifying defective pixels of an image sensor detected in a wafer level test will be described in detail with reference to the accompanying drawings. In the illustrated examples, a fuse blowing technology is applied in order to store addresses of the defective pixels of the image sensor detected from the test.

Figure 2:
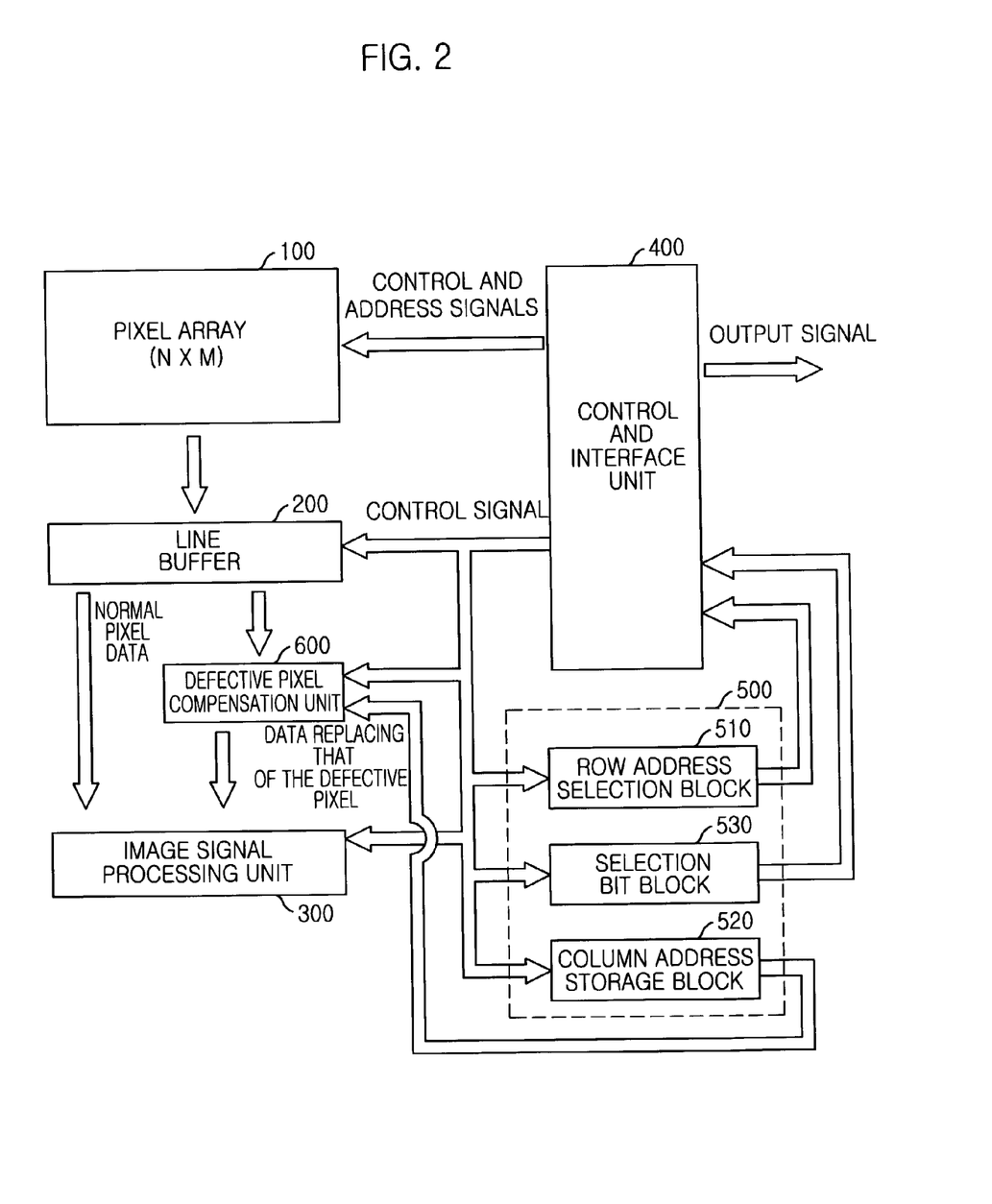
FIG. 2 is a block diagram of an example image sensor constructed in accordance with the teachings of the present invention.

FIG. 2 is a block diagram of an example image sensor capable of storing addresses of defective pixels by using the fuse blowing technology. Referring to FIG. 2, the image sensor includes a pixel array 100, a line buffer 200, an image signal processing unit 300, a defective pixel address storing unit 500, a control and interface unit 400 and a defective pixel compensation unit 600.

The line buffer 200 stores data transmitted from the pixel array 100. The image signal processing unit 300 performs signal processing to improve the performance of the image sensor in response to outputs of the line buffer 200. The defective pixel address storing unit 500 stores addresses of defective pixels by using the fuse blowing technology. These defective pixels are detected via a wafer level test. The control and interface unit 400 receives the address information of the defective pixels from the defective pixel address storing unit 500 and controls the overall operation of the image sensor. Also, the control and interface unit 400 manages an interface with an external system. The defective pixel compensation unit 600 receives the address information of the defective pixels from the defective pixel address storing unit 500, control signals from the control and interface unit 400 and pixel data from the line buffer 200. Thereby, the defective pixel compensation unit 600 compensates the data associated with the defective pixels by replacing the defective pixel data with normal pixel data from pixels around the defective pixels and outputs the replaced pixel data to the image signal processing unit 300.

The defective pixel address storing unit 500 employing the fuse blowing technology can be variously configured. The example illustrated in FIG. 2 shows the defective pixel address storing unit 500 employing a data processing scheme performed based on row addresses.

In FIG. 2, the defective pixel address storing unit 500 includes a row address selection block 510, a column address storage block 520 and a selection bit block 530. The row address selection block 510 stores information for whether or not defect pixels exist for each row of the pixel array 100 by switching a fuse on/off therein and outputs a row address selection signal RASS to the control and interface unit 400. The column address storage block 520 stores information for column addresses of the defective pixels and outputs a column address signal CAS to the defective pixel compensation unit 600. The selection bit block 530 stores information for correctly matching information stored in the row address selection block 510 and the column address storage block 520 and outputs a matching signal to the control and interface unit 400.

Figure 3A:
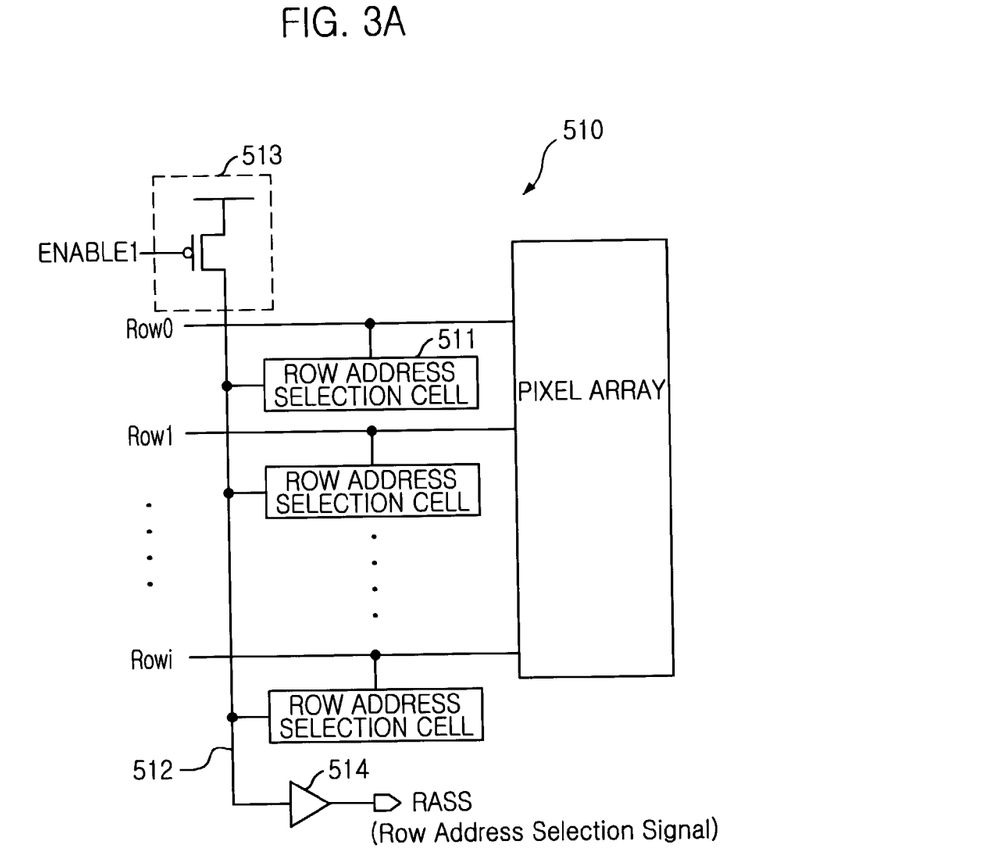
FIG. 3A is a detailed block diagram of an example row address selection block 510 used in the example of FIG. 2.

FIG. 3A is a detailed block diagram showing an example row address selection block 510 and FIG. 3B is a circuit diagram illustrating an example row address selection cell in the row address selection block 510. Referring to FIG. 3A, the row address selection block 510 includes a plurality of row address selection cells 511, an output line 512 and a precharge unit 513. The row address selection cells 511, which are coupled one by one to each row of the pixel array, output a first logic value corresponding to a first supply voltage Vss or a second logic value corresponding to a second supply voltage Vdd according to whether or not a defective pixel exists in a row. The output line 512 is commonly coupled to output nodes of the row address selection cells 511. The precharge unit 513 precharges the output line 512 with the second logic value corresponding to the second supply voltage Vdd.

Figure 3B:
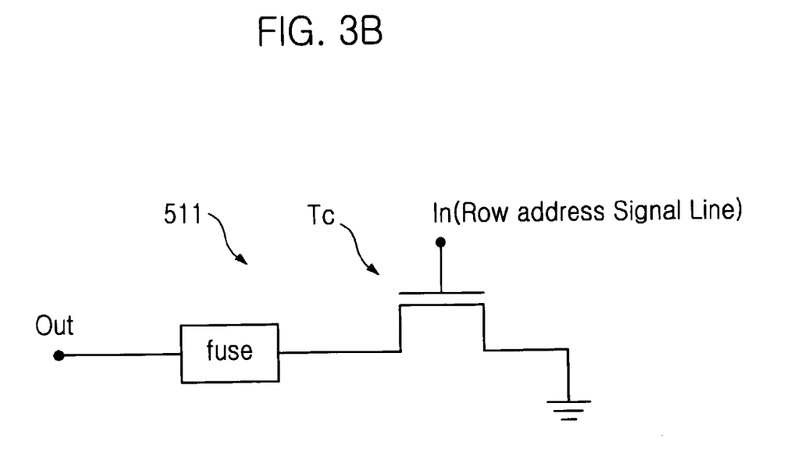
FIG. 3B is a circuit diagram illustrating an example row address selection cell in the example row address selection block of FIG. 3A.

Referring to FIG. 3B, the row address selection cell 511 includes a fuse which is coupled to an output node Out connected to the output line 512 and to an NMOS transistor. The gate of the NMOS transistor is coupled to a row address signal line. The source/drain of the NMOS transistor are coupled between the fuse and the first supply voltage Vss. The NMOS transistor is a switching device for connecting the first supply voltage node Vss and the output node Out in response to the row address signal.

In FIG. 3A, the precharge unit 513 is composed of a PMOS transistor precharging the output line 512 with the second supply voltage Vdd in response to a first enable signal ENABLE 1 provided from the control and interface unit 400.

The row address selection block 510 stores information indicating whether or not a defective pixel exists in each row of the pixel array by the selective blowing of fuses. That is to say, a fuse corresponding to a row in which a defective pixel is found, is blown, and a fuse corresponding to a row in which no defect pixel exist, is not blown. Accordingly, a logic value of the row address selection signal RASS of the output line 512 is differently outputted according to whether a defective pixel is present or not. If a defective pixel is present, the logic value is 1. If no defective pixel is present, the logic value is 0. The logic values can be changed according to the selection of the first and the second supply voltages Vss and Vdd or a logic circuit configuration.

Considering an operation of a row address selection cell 511 in FIG. 3B, after the output line 512 (i.e., the output node Out), is precharged and when a certain row address signal ROWi of a logic "high" is applied to the gate of the transistor, if the fuse is in an "ON" state (i.e., not blown), a current path between the output node Out and the ground Vss is formed. Thus, the output node Out becomes a logic "low" (i.e., "0"). On the other hand, if the fuse is in an "OFF" state (i.e., the fuse is blown), since the current path between the output node Out and the ground Vss is cut off, the output node Out maintains the precharge voltage level Vdd of a logic "high" (i.e., "1").

Figure 4:
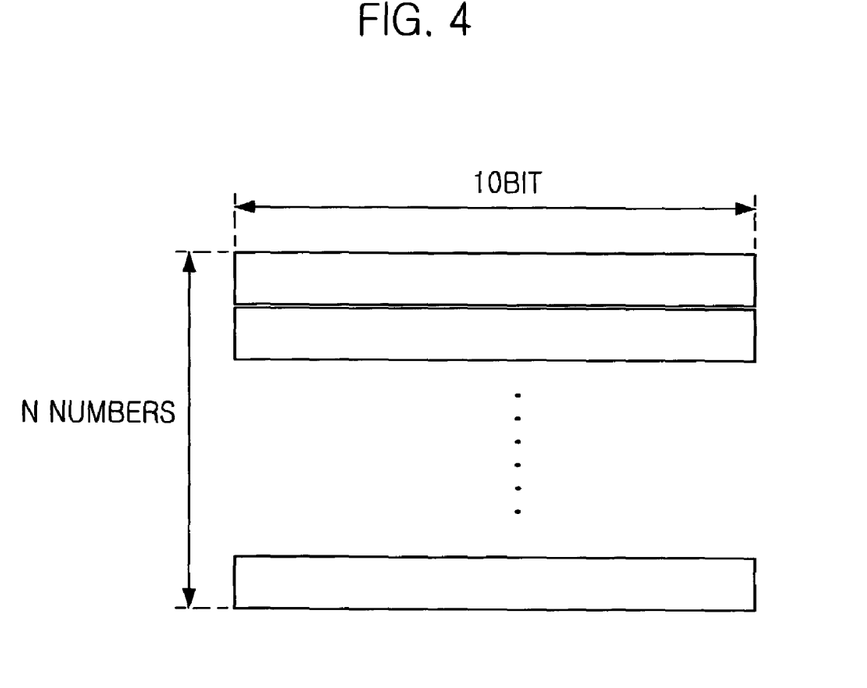
FIG. 4 is a diagram of an example column address storage block 520 for the example of FIG. 2.

FIG. 4 is a diagram illustrating an example column address storage block 520 of a VGA level (640×480 pixels). The horizontal size of the column address storage block 520 is determined by the number of columns of the pixel array. The vertical size varies according to the number of defective pixels to be compensated in the image sensor. In the case of the VGA level, since there are 640 columns, the horizontal size becomes 10 bits ($2^{10}=1024$). One address representing the column of the defective pixel can be stored by using 10 bits. Therefore, in order to compensate "N" defective pixels in the image sensor, "N" column addresses of 10 bits are required. The vertical size of the column address storage block 520 is determined by how many defective pixels are to be compensated, and the number of defective pixels to be compensated determines the performance of the image sensor.

Figure 5:
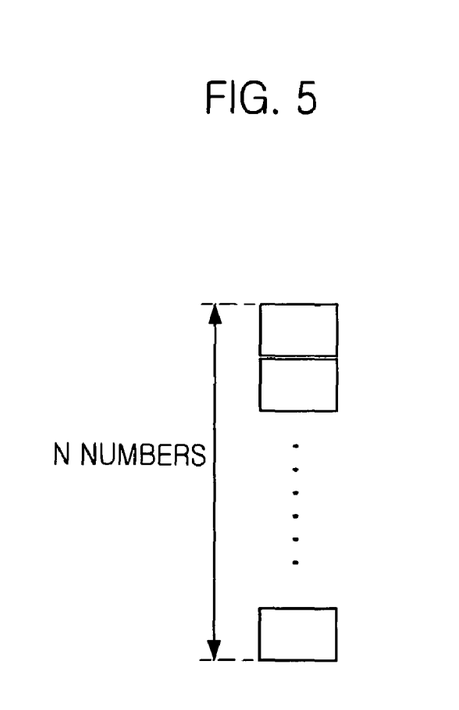
FIG. 5 is a block diagram of an example selection bit block 530 for the example of FIG. 2.

FIG. 5 is a block diagram of an example selection bit block 530. One selection bit is required for each column address corresponding to the defective pixel. Accordingly, in order to compensate N defective pixels, N selection bits are required. The selection bit block 530 is required to correctly match the row of the pixel array selected by the row address selection block 510 with the column of the pixel array selected by the column address storage block 520 for the defective pixel. That is to say, if the defective pixels are present at (row, column) positions of (10, 100) and (20, 200) in the pixel array, respectively, fuses are off at the $10^{th}$ row and the $20^{th}$ row of the row address selection block 510 and the row address selection signals are generated. And, the column addresses of the defective pixels are stored in the $100^{th}$ column and the $200^{th}$ column of the column address storage block 520. If the selection bit block 530 is absent, there may occur an error that the pixels at positions of (10, 200) and (20, 100) are recognized as defective pixels. Namely, the selection bit block 530 is used to avoid the above transposition error.

When a defective pixel is detected at a certain row by the row address selection block 510, if the detected pixel is the first defective pixel at the certain row, the selection bit is set to "0" and if otherwise, set to "1." Of course, the logic value of the selection bit can also be inversely defined according to the circuit configuration.

Figure 6:
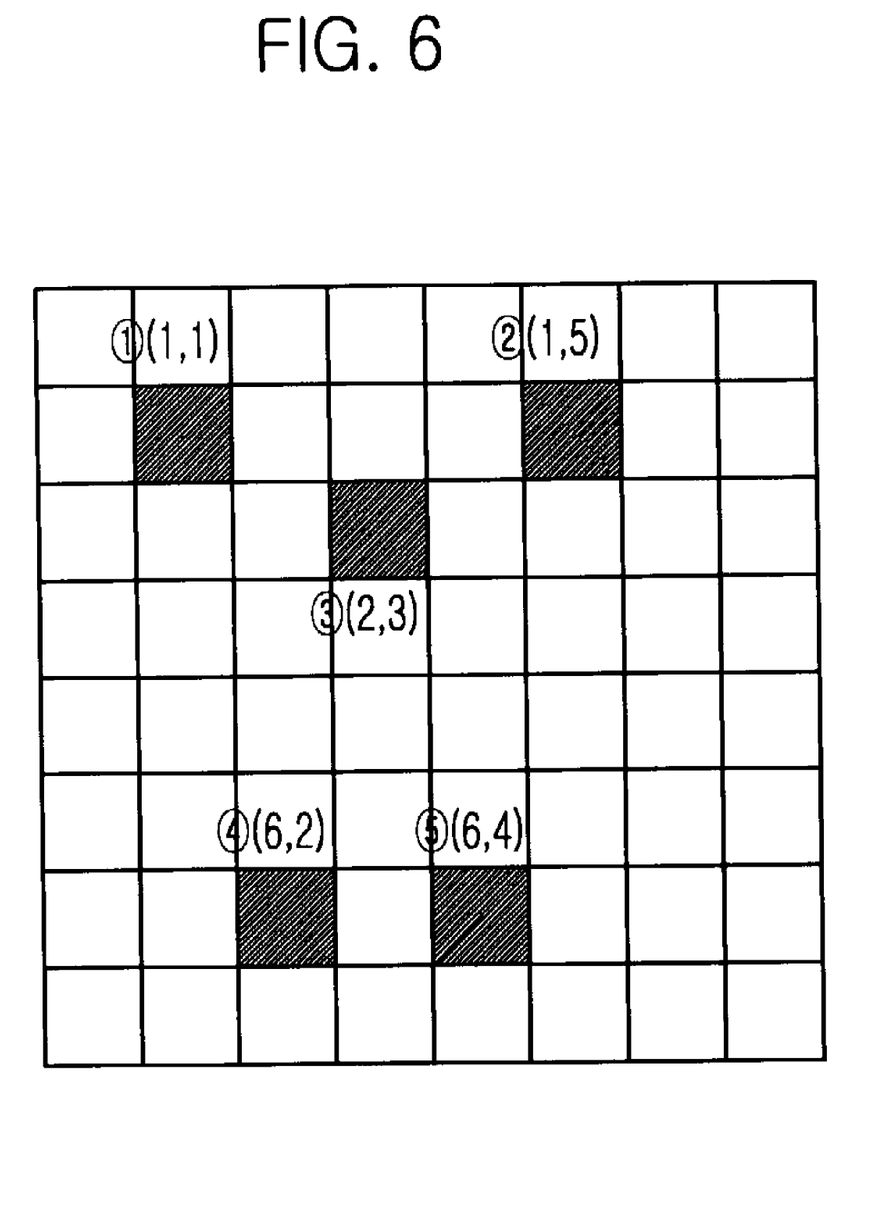
FIG. 6 is a diagram showing an example 8×8 pixel array having defective pixels.

Hereinafter, an example operation of the defective pixel address storing unit 500 will be explained for a case where there exist five defective pixels in an 8×8 pixel array. FIG. 6 is a diagram showing an example 8×8 pixel array having a first defective pixel 1 at (1, 1), a second defective pixel 2 at (1, 5), a third defective pixel 3 at (2, 3), a fourth defect pixel 4 at (6, 2) and a fifth defective pixel 5 at (6, 4). Herein, the symbol (x, y) shows a location of a pixel wherein x represents a row and y represents a column in the pixel array.

Figure 7:
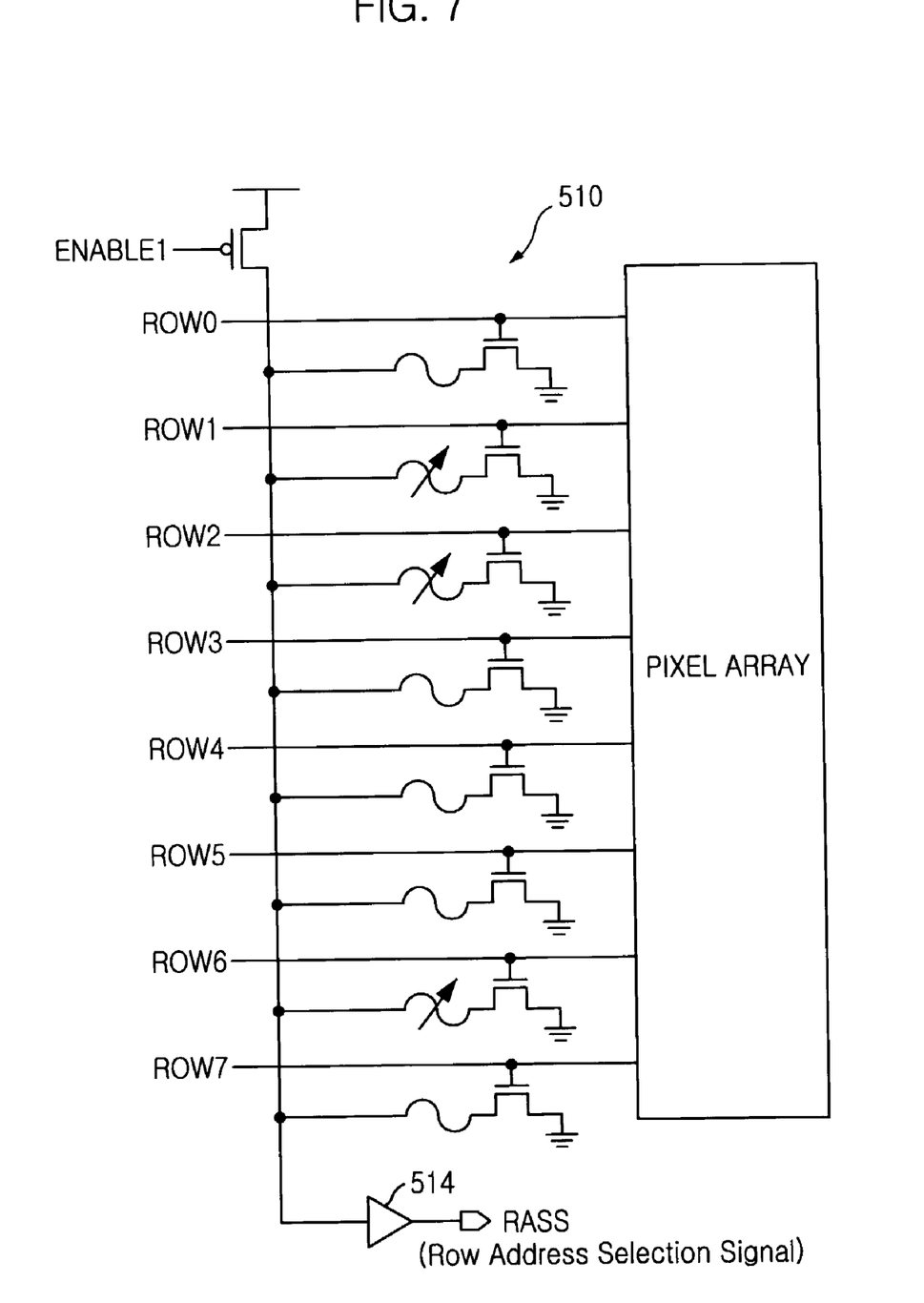
FIG. 7 is a detailed circuit diagram of an example row address selection block 510 for the example pixel array of FIG. 6.

Firstly, the defective pixels are detected by executing the wafer level test on the image sensor. The detected pixel information of the row address selection block 510, the column address storing block 520 and the selection bit block 530 is recorded before the image sensor chip is packaged through fuse blowing. For example, when the defective pixels are present at rows 1, 2 and 6 of the 8×8 pixel image sensor as shown in FIG. 6, fuses of 1, 2 and 6 rows of the row address selection block 510 are cut off as shown in FIG. 7. The fuses in FIG. 7 with arrows are in an "OFF" or blown state and the fuses in FIG. 7 without arrows are in an "ON" or current passing state.

Figure 8:
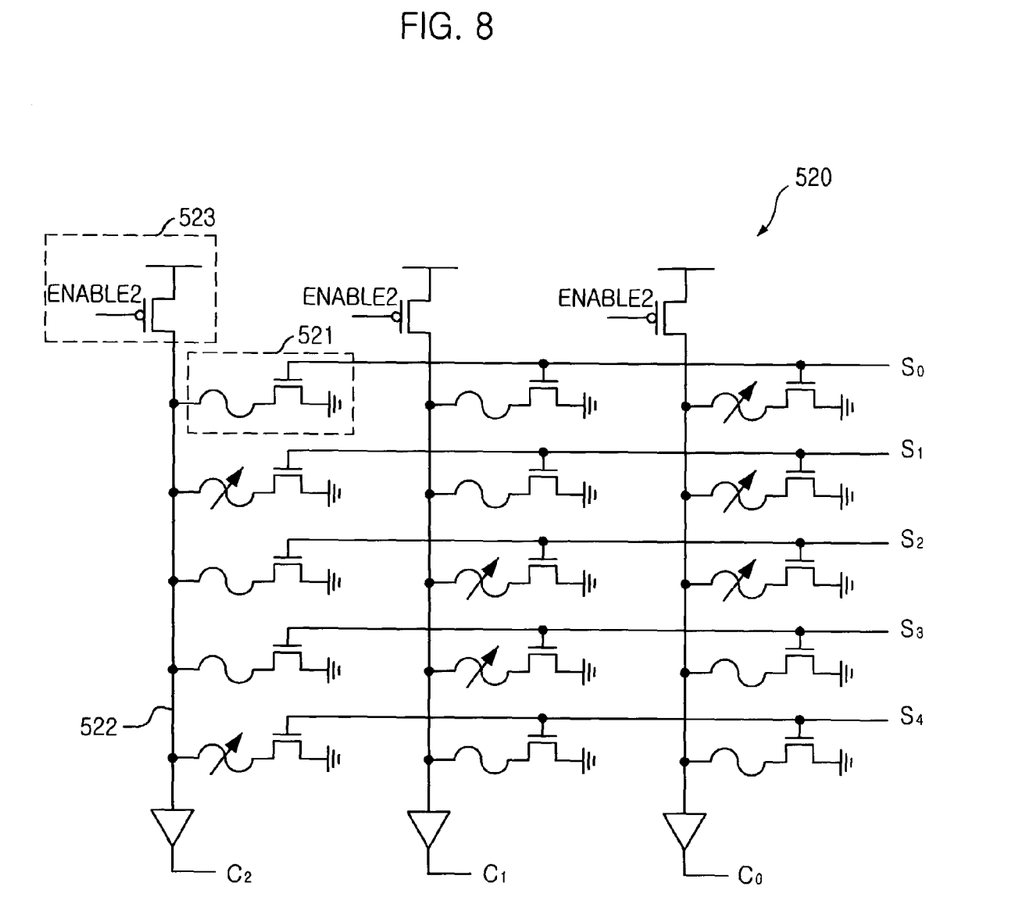
FIG. 8 is a detailed circuit diagram of an example column address storage block 520 for the example pixel array of FIG. 6.

Since the number of columns in the column address storage block 520 is eight, it can be expressed by using 3 bits. Since column addresses of the defective pixels 1–5 are 1, 5, 3, 2 and 4, respectively, the fuses are sequentially blown as shown in FIG. 8, so that the column addresses for the defective pixels are stored in the column address storage block 520. Namely, $C_0$, $C_1$ and $C_2$ are output values for the column addresses of the defective pixels. $C_2$ represents the most significant bit (MSB) and $C_0$ represents the least significant bit (LSB). Since the column address of the first defective pixel 1 is 1, a binary value '001' corresponding to the column address "1" of the first defective pixel 1 is stored in the cells of the first row of the column address storage block 520 as shown in FIG. 8.

Hereinafter, a circuit configuration of the column address storage block 520 will be described in detail. The column address storage block 520 includes a plurality of basic cells composed of a fuse with one side coupled to the output line Out. It also includes an NMOS transistor having a gate coupled to a selection signal line (e.g., $S_0$, $S_1$, . . . or $S_4$) and a source/drain path coupled between the first supply voltage Vss and the fuse. The plurality of basic cells are arranged in a matrix form. Namely, the column address storage block 520 includes column paths corresponding to the number of columns of the pixel array represented as a binary number, and row paths corresponding to the number of the defective pixels.

Considering a certain column path, the output line 522, which is commonly coupled to each output node of each basic cell 521, forms the column path. The column path includes a precharge unit 523 for precharging the output line 522 with the second supply voltage Vdd in response to a second enable signal ENABLE 2. The second enable signal ENABLE 2 is generated from the control and interface unit 400. The output signals $C_2$, $C_1$ and $C_0$ of the three output lines are transmitted to the defective pixel compensation unit 600.

The row paths are selection signal lines (e.g., $S_0$ to $S_4$) which are commonly coupled to the gates of the NMOS transistors of the basic cells on corresponding rows. The selection signals (e.g., $S_0$ to $S_4$) are generated by the control and interface unit 400.

Figure 9:
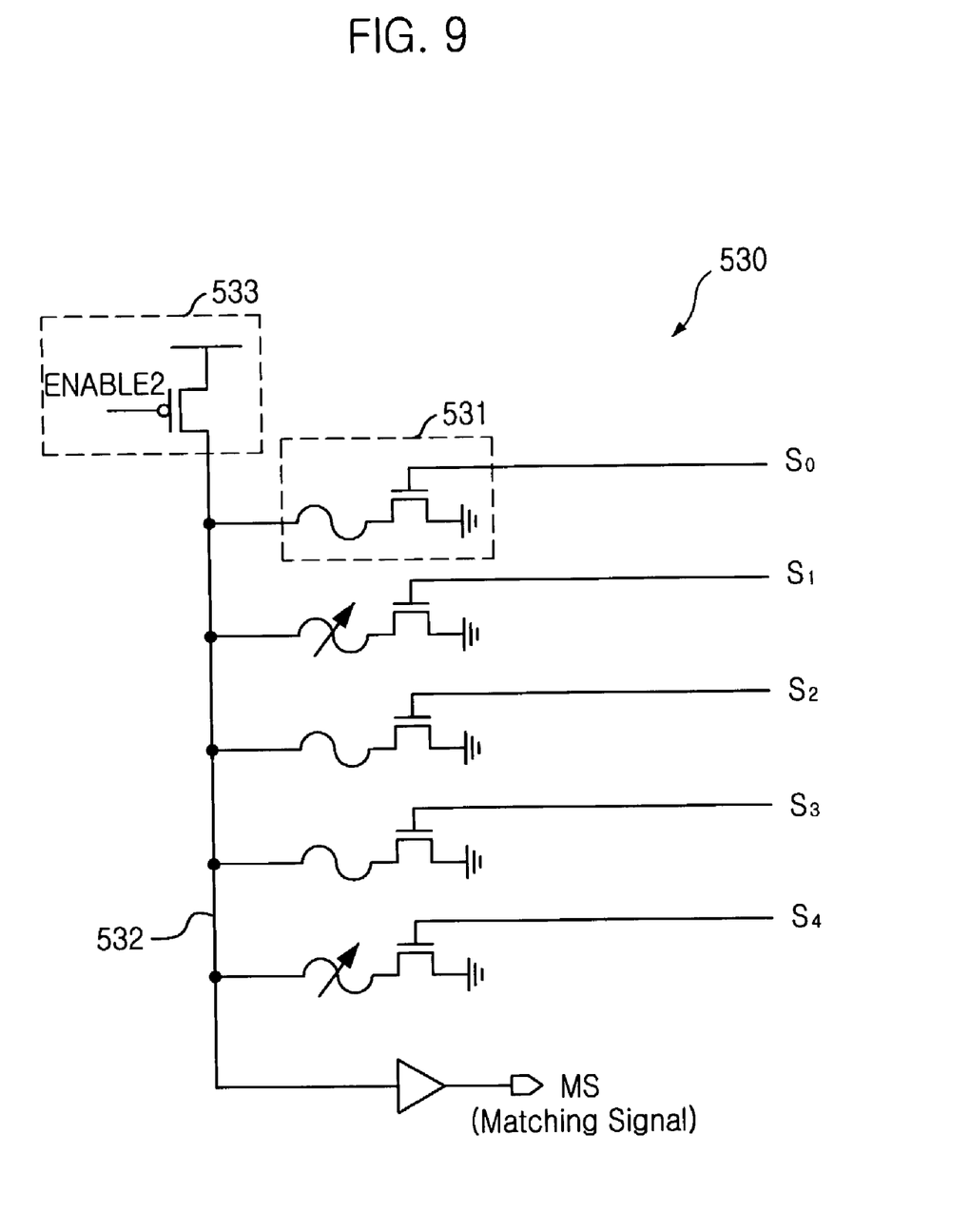
FIG. 9 is a detailed circuit diagram of an example selection bit block 530 for the example pixel array of FIG. 6.

In the selection bit block 530, since the defective pixels 1, 3 and 4 are the first defective pixels at each row, '0' is stored as their selection bits. On the other hand, since the defective pixels 2 and 5 are not the first defective pixels on their respective rows, '1' is stored as their selection bits. Namely, as shown in FIG. 9, the values of '0', '1', '0', '0' and '1' are sequentially stored for the defective pixels 1–5, respectively.

The detailed circuit configuration of the selection bit block 530 is identical to one of the column paths of the column address storage block 520. That is, the selection bit block 530 includes a plurality of basic cells, an output line 532 commonly coupled to output nodes of the basic cells, selection signal lines (e.g., $S_0$ to $S_4$) and a precharge unit 533 for precharging the output line 532. The basic cell 531 is composed of a fuse with one side coupled to the output line 532 and an NMOS transistor. The gate of the NMOS transistor is coupled to the selection signal lines (e.g., $S_0$, $S_1$, . . . or $S_4$) and the source/drain of the transistor is coupled between the fuse and the first supply voltage Vss.

As mentioned above, a defective pixel is detected by the wafer level test. The address information for the defective pixel is stored in the row address selection block 510, the column address storage block 520, and the selection bit block 530 through fuse blowing before the image sensor chip is packaged.

Figure 10:
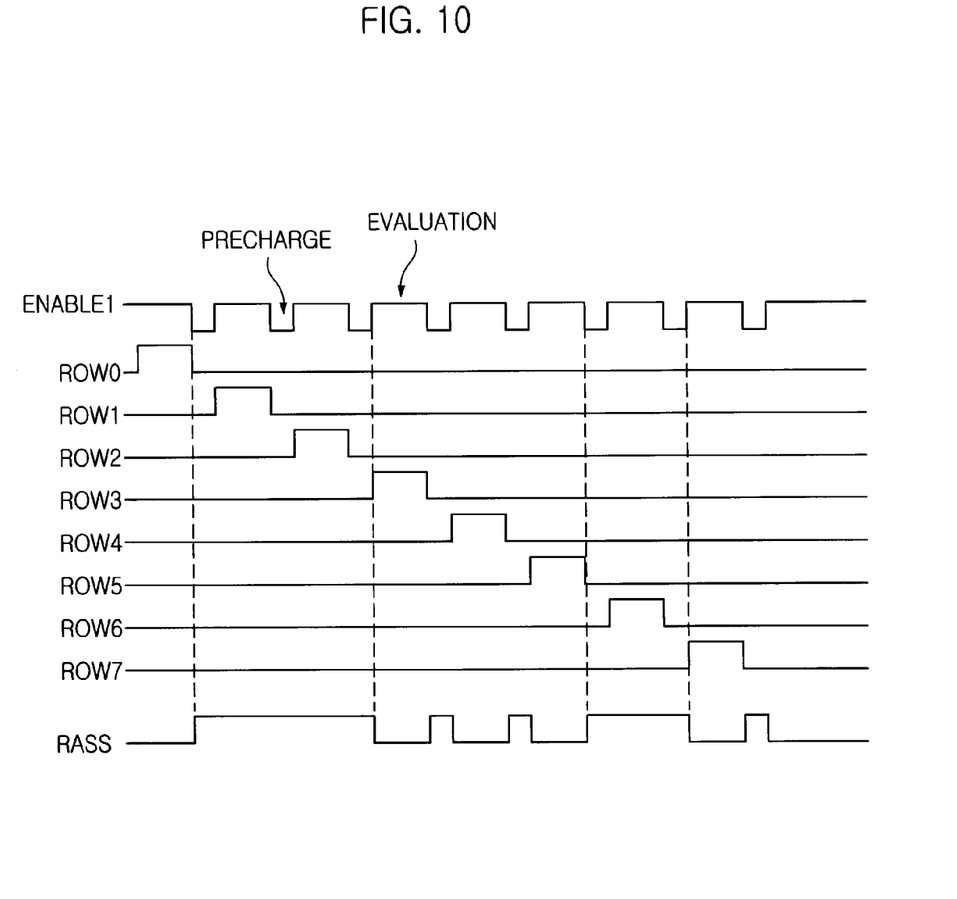
FIG. 10 is a timing diagram for each signal in the example of FIG. 7.
Figure 11:
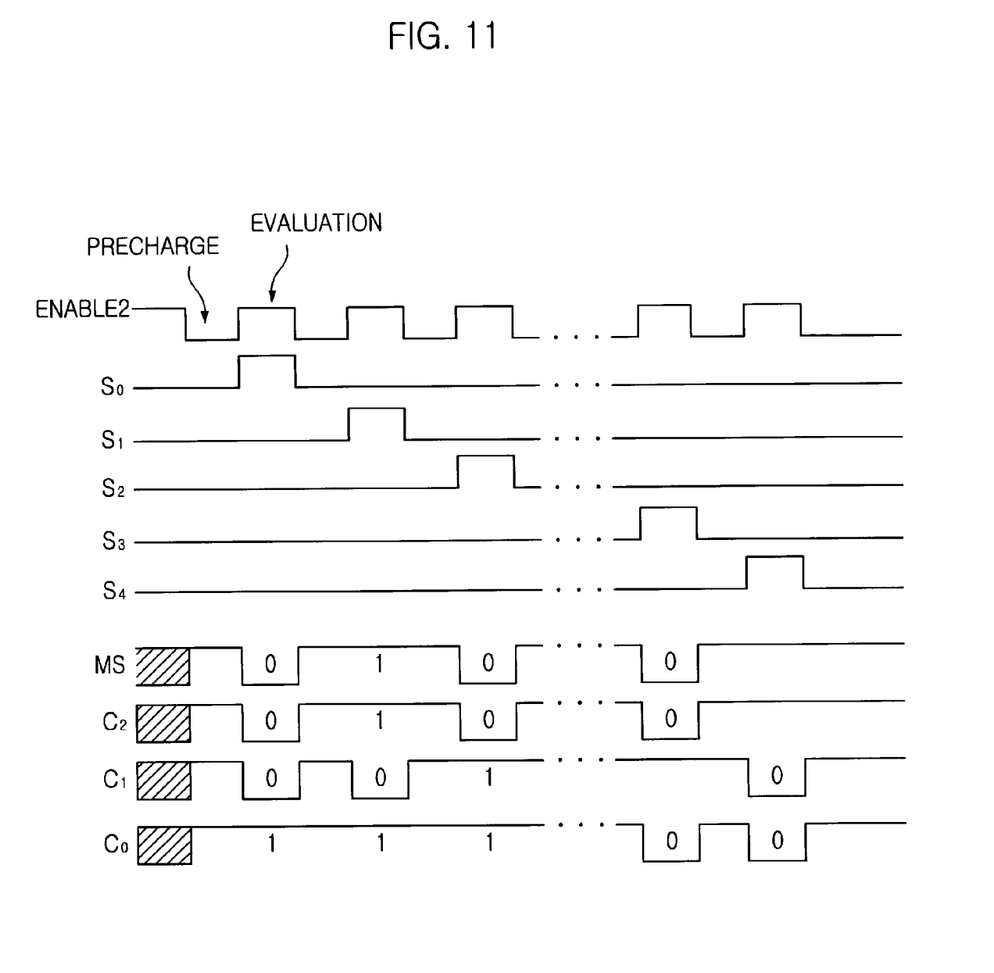
FIG. 11 is a timing diagram for each signal in the example of FIGS. 8 and 9.

FIG. 10 is a timing diagram of the input/output signals of the row address selection block 510. FIG. 11 is a timing diagram of the input/output signals of the column address storage block 520 and the selection bit block 530. Referring to FIGS. 10 and 11 example operations of the defective pixel address storing unit 500 and the image sensor employing the same will be described in detail.

When the image sensor receives an image from the exterior, the row address signals Row0 to Row7 are sequentially applied to the pixel array 100 from the control and interface unit 400 and then data associated with each pixel of the pixel array is outputted. At this time, the row address signals Row0 to Row7 are sequentially activated at the row address selection block 510 and the result of the row address selection signal RASS showing whether or not a defective pixel is present at a specific row is provided to the control and interface unit 400.

That is, when the row address signal Row0 is activated to "high" by the control and interface unit 400, since the corresponding fuse of the row address selection block 510 is an "ON" state, the row address selection signal RASS, which was in a logic "high" state at the precharging period, is inverted to a logic "low" state. Thus, information that no defective pixel exists at the row 0, is obtained in response to the row address selection signal RASS.

Subsequently, when the Row1 is activated to "high" and applied, since the corresponding fuse of the row address selection block 510 is in an "OFF" state, the row address selection signal RASS is maintained in the precharge state (i.e., '1'), so that the control and interface unit 400 receives information indicating that at least one defective pixel exists at row 1 of the pixel array. Subsequently, a selection signal $S_0$ is generated at a logic "high" state by the control and interface unit 400. Since the value of a matching signal MS outputted from the selection bit block 530 is '0', there is obtained information indicating that this is the first defective pixel among the defective pixels on the row 1. Also, the binary value '001', indicating the first defective pixel column address information previously stored in the column address storage block 520, is transmitted to the defective pixel compensation unit 600.

The defective pixel compensation unit 600 receives the location information associated with the defective pixel from the control and interface unit 400 and the column address storage block 520. It then matches the row location and the column location (1, 1), so that the precise location information for the defective pixel 1 is obtained and the data of the first defective pixel 1 is replaced with data from adjacent normal pixels and is processed in the image processing unit 300.

Next, when a selection signal $S_1$ is generated at a logic "high" state by the control and interface unit 400 and the matching signal MS outputted from the selection bit block 530 is '1', information is obtained indicating that the defective pixel is not the first defective pixel among the defective pixels on the row 1. Also, the binary value '101', which is the second defective pixel column address information value previously stored in the column address storage block 520 and indicates the fifth column, is transmitted to the defective pixel compensation unit 600.

The defective pixel compensation unit 600 receives the location information associated with the defective pixel from the control and interface unit 400 and the column address storage block 520 and matches the row location and the column location (1, 5), so that precise location information for the defective pixel 2 is obtained. The data of the second defective pixel 2 is then replaced with data from adjacent normal pixels and is processed in the image processing unit 300.

Subsequently, when the Row2 is applied with a logic "high", the row address selection signal RASS becomes a logic '1' signal. Thus, information is obtained that a defective pixel exists on row 2 of the pixel array. Also, location information (2, 3) of the third defective pixel 3 is obtained from the binary value '011', which is the defective pixel column address recorded in the column address storage block 530. The matching signal MS is a logic '0'.

The location information of the remaining defective pixels 4 and 5 is also obtained according to the above procedures and their data is compensated in the same manner as shown above.

FIG. 11 shows an example timing diagram for the matching signal MS (which is an output of the selection bit block 530), and the column address information $C_2$, $C_1$ and $C_0$ (which are outputs of the column address storage block 520). When the second enable signal Enable2 has a logic value '0', the column address information $C_2$, $C_1$ and $C_0$ are in a precharge state '1'. And then, when the selection signals $S_0$ to $S_4$ are applied with a logic "high" state at a desired time, respectively, the C2, C1 and C0 become to have the logic value '0' or '1' according to the on/off states of corresponding fuses.

The rows, on which the defective pixels are present, are selected by the output signal RASS of the row address selection block 510. The column address information of the defective pixels previously stored in the column address storage block 520 is sequentially recognized by the defective pixel compensation unit 600 in response to the output signal MS of the selection bit block 530, so that incorrect data corresponding to the defective pixels are replaced with the adjacent normal pixel data and then the replaced data are processed in the image signal processing unit 300. As a result, damage to the image due to the incorrect data of the defective pixels can be removed or reduced.

Figure 12:
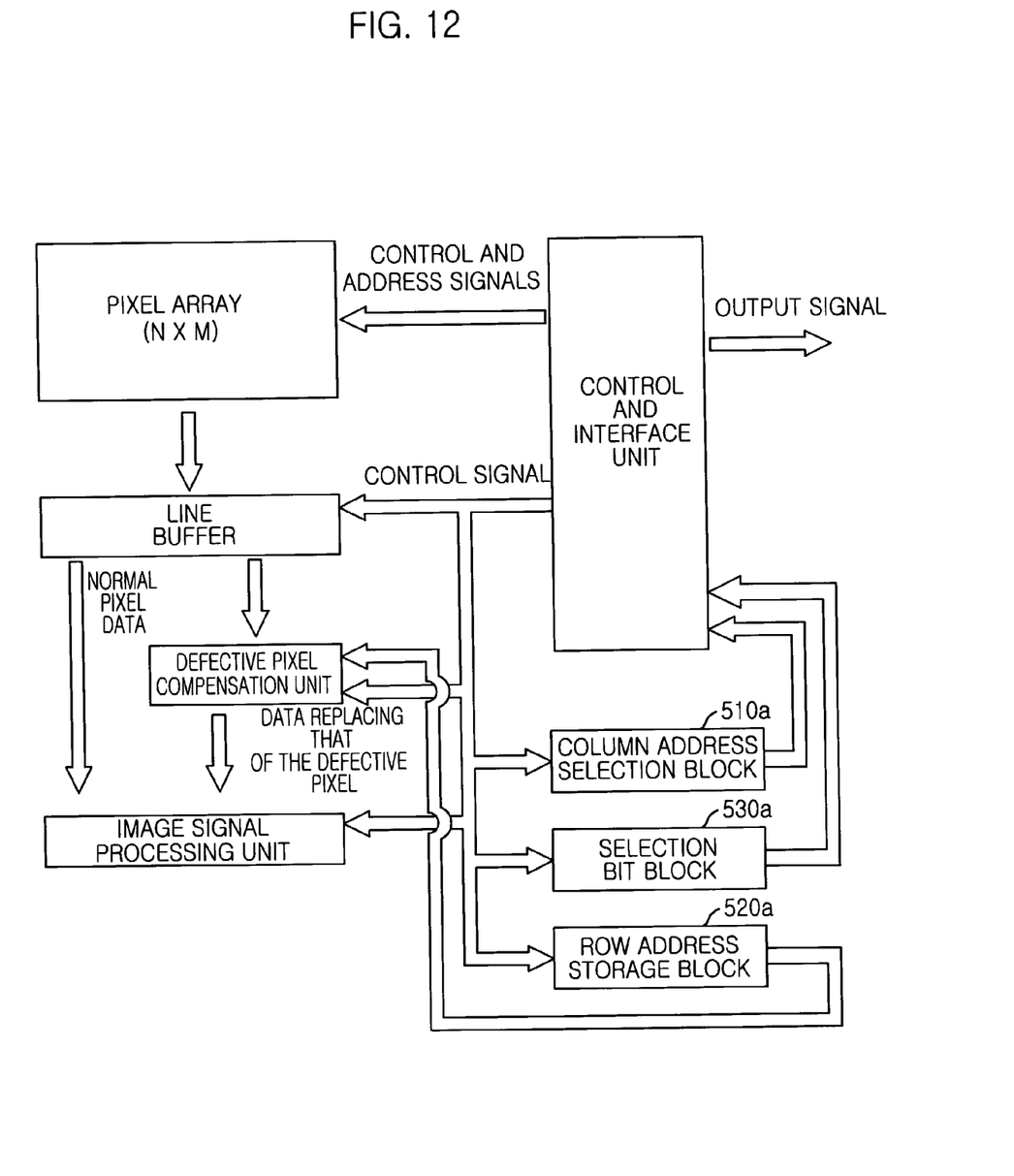
FIG. 12 is a block diagram of an example image sensor constructed in accordance with the teachings of the present invention.

The defective pixel address storing unit 500 can be differently implemented. Using the row address selection block 510, the column address storage block 520 and the selection bit block 530 as shown in FIG. 2 is a case wherein the data processing of the image sensor is carried out based on the row addresses under the control of the control and interface unit 400. If the data processing is carried out based on the column addresses, the defective pixel address storing unit 500 is constructed by a column address selection block 510a, a row address storage block 520a and the selection bit block 530a as shown in FIG. 12.

Figure 13:
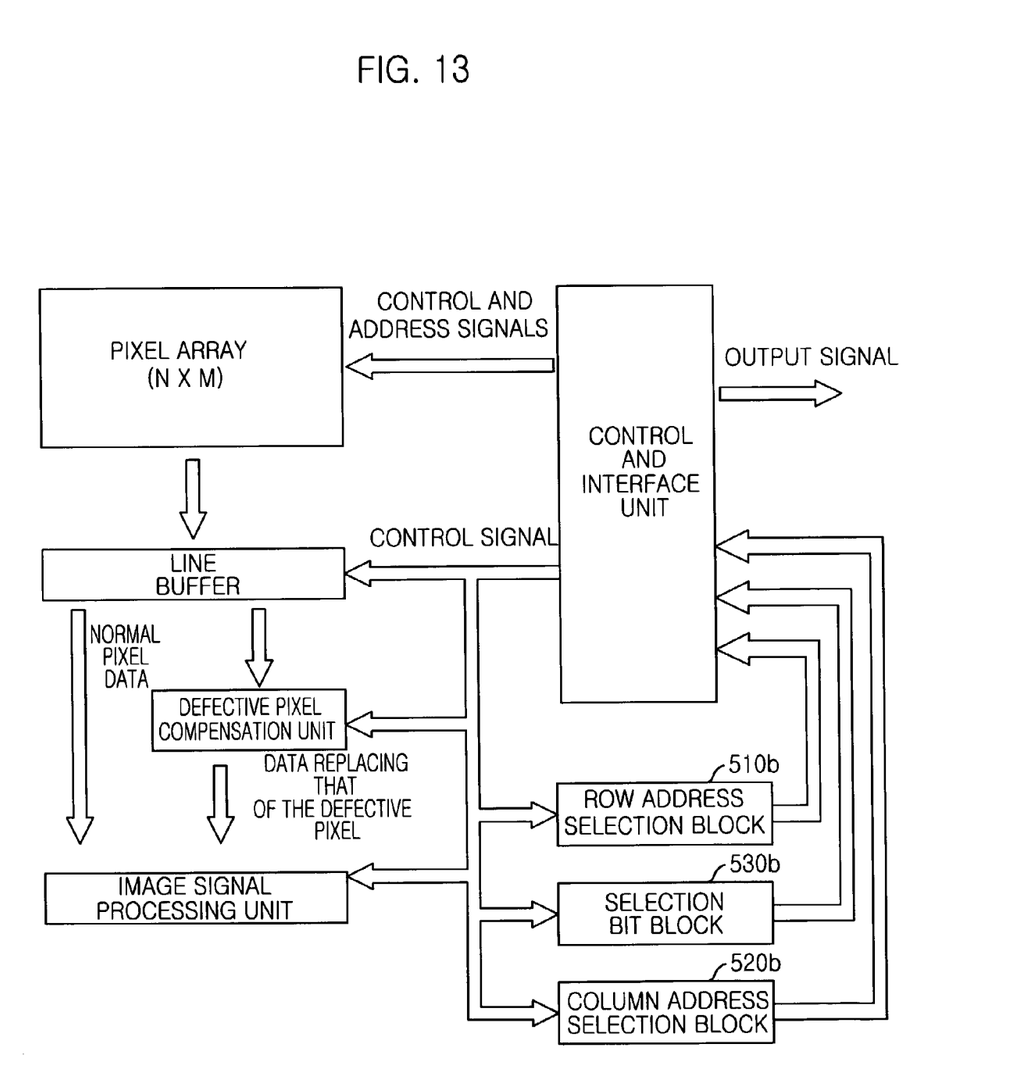
FIG. 13 is a block diagram of an example image sensor constructed in accordance with the teachings of the present invention.

Also, when the row addresses and the column addresses are simultaneously used in the data processing of the image sensor, the defective pixel address storing unit 500 includes a row address selection block 510b, a column address selection block 520b and a selection bit block 530b as shown in FIG. 13.

The addresses corresponding to the defective pixels of the image sensor are recorded and the defective pixel data can be compensated by the defective pixel compensation unit 600. Therefore, the image sensor including the defective pixels can be used like a normal image sensor (i.e., an image sensor without defects). Furthermore, because of increasing the product yield, the fabricating cost is reduced. Particularly, as the number of pixels in the image sensor is increased, the probability, that defective pixels will occur, is also increased. Accordingly, by using the apparatus and methods disclosed herein the yield will be substantially increased.

Since an EEPROM is not needed for storing the addresses of the defective pixel, the problems for fabricating the image sensor including the EEPROM and for recording the addresses of the defective pixels in the EEPROM can be solved.

Also, when fabricating the image sensor chip, since the address of the defective pixels are directly obtained during the wafer level test, the company using the image sensor does not need to re-test the defective pixels, so that a product development time of the company can be reduced.

Comparing the address storing method employing the fuse blowing technology as disclosed herein with the conventional method storing all addresses of the row and the column of the defective pixels, as the number of the defective pixels is increased, the hardware complexity will be reduced by employing the method disclosed herein. For instance, in the case of a mega-pixel array having more than 1.3 million pixels (1280×1024=1310720 pixels), 10 bits ($2^{10}$=1024) are required for distinguishing the rows (1024) and 11 bits ($2^{11}$=2048) for distinguishing the columns (1280) to thereby record all addresses of the rows and the columns of the defective pixels. Accordingly, 21 bits (10 bits+11 bits) are required to store the address of one defective pixel. That is to say, for storing addresses of N defective pixels, N×21 bits are required. However, the row address selection block requires 1024 bits which is identical to the number of the rows of the pixel array regardless of the number of the defective pixels and the column address storage block requires 11N bits. And, the selection bit block requires 1N bits. Namely, 1024+12N bits (1024+11N+1N) are the total number of bits required in the disclosed method.

For example, in order to compare 21N bits required in the conventional method with 1024+12N bits required in the disclosed method, the recording of 256 defective pixels will be described. The existence of 256 defective pixels means that there exists one defective pixel per about 5000 pixels for the pixel array having 1.3 million pixels. The addresses of the defective pixels are stored by using 5376 bits (21×256) according to the prior art. On the other hand, in accordance with the method disclosed herein, 4096 bits (1024+12×256) are required therefor. Accordingly, when storing the addresses of 256 defective pixels, the method disclosed herein can obtain the hardware reduction as much as about 1200 bits.

Although certain apparatus and methods have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An image sensor comprising:
   an image sensing means for receiving an image information of an external objects to thereby perform a signal processing with the image information;
   a defective pixel address storage unit to store addresses of defective pixels by using a fuse blowing technology, the addresses of the defective pixels being detected through a wafer level test for the image sensor, wherein the defective pixel address storing means includes:
   a row address selection block for storing a first information representing whether or not at least one defective pixel is present on each row of the pixel array and outputting row address selection signals corresponding to the first information to the image sensing block;
   a column address storing block for storing a second information of column addresses of the defective pixels and outputting column address selection signals corresponding to the second information to the image sensing block; and
   a selection bit block for storing a third information for correctly matching the first information with the second information to thereby output matching signals corresponding to the third information to the image sensing block;
   a defective pixel compensation unit to receive the address information of the defective pixels from the defective pixel address storage unit, to substitute data of normal pixels around the defective pixels for data of the defective pixels.

2. The image sensor as recited in claim 1, wherein the image sensing means includes:
   a pixel array;
   a data storing means for storing data transmitted from the pixel array;
   an image signal processing means for performing signal processing to improve the performance of the image sensor according to outputs of the data storing means; and
   a control means for receiving address information of the defective pixels from the defective pixel address storing means and controlling the whole operation of the image sensor.

3. An image sensor as recited in claim 2, wherein the row address selection block includes:
   a plurality of row address selection cells, wherein the cells are respectively associated with the rows in the pixel array, and wherein the row address selection cells output a first logic value corresponding to a first voltage or a second logic value corresponding to a second voltage depending on whether or not a defective pixel exists in a row;
   an output line commonly coupled to output nodes of the plurality of row address selection cells; and
   a precharge unit for precharging the output line with a second logic value corresponding to the second voltage.

4. An image sensor as recited in claim 3, wherein at least one of the row address selection cells includes:
   a fuse coupled to the output line; and
   a MOS transistor having a gate coupled to a row address signal line and a drain/source path coupled between the fuse and a first voltage node.

5. An image sensor as recited in claim 4, wherein the fuse in the row address selection cell is blown if the cell corresponds to a row having a defective pixel detected in the wafer level test.

6. An image sensor as recited in claim 4, wherein the first voltage is a ground voltage and the MOS transistor is an NMOS transistor.

7. An image sensor as recited in claim 4, wherein the precharge unit includes a PMOS transistor to precharge the output line with a power supply voltage in response to a first enable signal provided from the control unit.

8. An image sensor as recited in claim 2, wherein the column address storing block includes:
   a plurality of basic cells arranged in a matrix, wherein each of the basic cells has a fuse coupled to an output node and a switching transistor having a gate coupled to a selection signal line connected to the control unit and a drain/source path coupled between the fuse and a first voltage node;
   a plurality of column paths corresponding to a number of columns of the pixel array; and
   a plurality of row paths corresponding to a number of defective pixels.

9. An image sensor as recited in claim 8, wherein each of the column paths includes:

an output line commonly coupled to the output node of a set of the basic cells; and a precharge unit to precharge the output line with a second voltage in response to a second enable signal provided from the control unit.

10. An image sensor as recited in claim 9, wherein the first voltage is a ground voltage and the switching transistors are NMOS transistors.

11. An image sensor as recited in claim 10, wherein the precharge unit includes a PMOS transistor to precharge the output line with a power supply voltage in response to the second enable signal.

12. An image sensor as recited in claim 8, wherein each of the row paths includes a selection signal line commonly coupled to the gates of the switching transistors of a set of the basic cells thereon.

13. An image sensor as recited in claim 2, wherein the selection bit block stores the third information representing whether or not a corresponding defective pixel is a first defective pixel on a row of the pixel array.

14. An image sensor as recited in claim 2, wherein the selection bit block includes:

a plurality of basic cells, wherein each basic cell has a fuse coupled to an output node and a MOS transistor having a gate coupled to a selection signal line connected to the control unit and a source/drain path coupled between the fuse and a first voltage node;

an output line commonly coupled to the output node of each basic cell; and a precharge unit for precharging the output line.

15. An image sensor as recited in claim 14, wherein a number of the basic cells corresponds to a number of the defective pixels.

16. An image sensor as recited in claim 14, wherein the fuse of a basic cell is blown when a defective pixel associated with that cell is the first defective pixel on a row of the pixel array.

17. The image sensor as recited in claim 2, wherein the row address selection signals are outputted to the control means and the column address selection signals are outputted to the defective pixel compensation means.

18. The image sensor as recited in claim 2, wherein the row address selection signals are outputted to the defective pixel compensation means and the column address selection signals are outputted to the control means.

19. The image sensor as recited in claim 2, wherein the row address selection signals and the column address selection signals are outputted to the control means.

* * * * *

UNITED STATES PATENT AND TRADEMARK OFFICE
CERTIFICATE OF CORRECTION

PATENT NO. : 7,027,089 B2 Page 1 of 1
APPLICATION NO. : 10/189942
DATED : April 11, 2006
INVENTOR(S) : Oh-Bong Kwon et al.

It is certified that error appears in the above-identified patent and that said Letters Patent is hereby corrected as shown below:

On the Title Page:

Item (73), Assignee address, "Kyounki-Do" should be -- Kyoungki-Do --.

Signed and Sealed this

Ninth Day of January, 2007

JON W. DUDAS
*Director of the United States Patent and Trademark Office*